(12) United States Patent
Kim et al.

(10) Patent No.: US 6,599,333 B1
(45) Date of Patent: Jul. 29, 2003

(54) METHOD OF MANUFACTURING LITHIUM SECONDARY BATTERY

(75) Inventors: Hee Tak Kim, Suwon-si (KR); Jung Min Song, Gyeonggi-do (KR); Sun Wook Kim, Seoul (KR)

(73) Assignee: Ness Co., Ltd., Suwon-si (KR)

( * ) Notice: Subject to any disclaimer, the term of this patent is extended or adjusted under 35 U.S.C. 154(b) by 53 days.

(21) Appl. No.: 09/709,710

(22) Filed: Nov. 13, 2000

Related U.S. Application Data

(63) Continuation-in-part of application No. 09/484,535, filed on Jan. 18, 2000, now Pat. No. 6,403,266.

(51) Int. Cl.[7] .................. H02M 10/04; H02M 10/40
(52) U.S. Cl. ............... 29/623.2; 29/623.15; 429/309; 429/316
(58) Field of Search .................. 29/623.2, 623.5; 429/94, 152, 309, 316

(56) References Cited

U.S. PATENT DOCUMENTS

| | | | | |
|---|---|---|---|---|
| 5,603,737 A | * | 2/1997 | Marincic et al. ......... | 429/94 X |
| 5,741,608 A | * | 4/1998 | Kojima et al. .......... | 429/152 X |
| 5,922,493 A | * | 7/1999 | Humphrey et al. ........ | 429/316 |
| 6,024,773 A | * | 2/2000 | Inuzuka et al. ......... | 29/623.5 X |
| 6,051,343 A | * | 4/2000 | Suzuki et al. .......... | 429/316 |
| 6,114,061 A | * | 9/2000 | Dix et al. ............. | 29/623.2 X |
| 6,124,061 A | * | 9/2000 | Hamano et al. ......... | 429/316 |
| 6,235,065 B1 | * | 5/2001 | Pasquier .............. | 29/623.5 X |

FOREIGN PATENT DOCUMENTS

| | | | | |
|---|---|---|---|---|
| EP | 858119 | * | 8/1998 | ........ H01M/10/40 |

* cited by examiner

*Primary Examiner*—Stephen Kalafut
(74) *Attorney, Agent, or Firm*—Jacobson Holman PLLC

(57) ABSTRACT

Disclosed is a method of manufacturing a lithium secondary battery. A polymer mixture including a) polyvinylidene fluoride-based polymer and b) at least one polymer selected from the group consisting of polyacrylonitrile and polymethyl methacrylate is mixed with a solvent in which a lithium salt is dissolved. The mixing ratio of the polymer mixture and the solvent is about 1:3–10. Thus obtained first mixture is heated to obtain a polymer electrolyte composition. And this polymer electrolyte composition is coated onto a first electrode which is one of an anode and a cathode, and then dried to obtain a polymer electrolyte layer. Then, a second electrode which is a remaining one of the anode and cathode is attached onto the polymer electrolyte layer. The polymer electrolyte has a good mechanical strength and the lithium secondary battery has a stable charge/discharge characteristic.

10 Claims, 11 Drawing Sheets

METHOD OF MANUFACTURING LITHIUM SECONDARY BATTERY

This is a continuation-in-part of U.S. Pat. Ser. No. 09/484,535 filed on Jan. 18, 2000, which is now U.S. Pat. No. 6,403,266.

BACKGROUND OF THE INVENTION

1. Field of the Invention

The present invention relates to a method of manufacturing a lithium secondary battery, and more particularly, to a method of manufacturing a lithium secondary battery having a high ionic conductivity, good mechanical properties, a stable interface characteristic, a good discharging characteristic at a high and low temperature and an efficient discharging characteristic.

2. Description of the Prior Art

There has been a great deal of interest in developing better and more efficient methods for storing energy for applications such as cellular communication, satellites, portable computers and electric vehicles. In particular, great effort has been dedicated to the development of a lithium ion battery having a cathode including lithium, an anode including lithium or carbon and a non-aqueous electrolyte, because of its higher energy density than that of a lead storage battery or nickel-cadmium battery having an aqueous electrolyte.

However, recently, the widely used lithium ion battery which has a satisfactory ionic conductivity uses a liquid electrolyte, however, the leakage of the liquid electrolyte occurs freuently. Moreover, any leakage in the cell lessens the performance of the battery. Accordingly, lithium ion batteries are packaged with an aluminum can and are provided with various protective devices, thereby enlarging the volume of the cell, and reducing the energy density to an undesirable degree. Furthermore, such a lithium ion battery is not applicable to a battery having thickness of 3 mm or less.

In contrast, lithium ion polymer batteries which utilize polymer electrolyte instead of the liquid electrolyte, are free from problems of leakage, have an improved stability and have a reduced volume because the electrolyte is impregnated into a polymer matrix. In addition, since the polymer electrolyte and electrodes can be attached together, a stack-type battery as well as a winding-type battery can be manufactured. However, they tend to exhibit inferior properties compared to the liquid electrolytes. This is attributed by the fact that ionic conductivities for the solid electrolytes are often 5–100 times inferior to that of the liquid electrolytes.

In general, a polymer lithium secondary battery includes an anode, a polymer electrolyte and a cathode. The components are selected to satisfy various conditions of the secondary battery such as lifetime, capacity, temperature characteristic, stability, etc.

As for the components of the cathode applied to the lithium ion polymer battery, lithium oxide complex ($LiCoO_2$, $LiMn_2O_4$, $LiNiO_2$) which has a laminated structure and lithium ion can be inserted between layers or separated from layers, can be used. As of the components for the anode, carbon compounds such as graphite compounds or coke can be used and these are examples of which include mesocarbon microbeads (MCMB) and mesophase carbon fiber (MPCF).

A polymer electrolyte which is widely used as a main component of the lithium battery is free from the leakage problem. The manufacturing of the battery using the polymer electrolyte does have some advantages, however, the polymer electrolyte is required to have a good ionic conductivity, a thermal and electrochemical stability, a good mechanical strength and a good adhesiveness to the electrodes.

The polymer electrolytes which is currently used or under development include a main liquid-type organic solvent such as ethylene carbonate and propylene carbonate, a vice liquid-type organic solvent such as dimethyl carbonate, diethyl carbonate and ethyl methyl carbonate, and polyvinylidene difluoride-based compounds (PVdF), polyacrylonitriles (PAN), polyethylene oxides, a copolymer thereof or a mixture thereof, which can accept lithium salts such as $LiPF_6$ and $LiAsF_6$.

The polymer electrolyte including the polyvinylidene fluoride compounds has a good mechanical strength. However, the adhesiveness to the electrodes is not sufficient and this requires an adhering process using heat or pressure. The solvent might evaporate during the adhering process of the electrodes to the electrolyte. Thus, films which do not contain the electrolyte are adhered to the electrodes and then additional impregnation process is implemented to the solvent.

When polyacrylate polymer electrolytes having good affinity to the solvent are used in order to increase the adhesiveness to the electrodes, it can be accomplished, however, the mechanical intensity of the electrolyte is not good.

One class of polymer electrolytes, specifically gel electrolytes in which liquid electrolyte is dispersed in a polymer matrix, includes a significant fraction of solvents in addition to the salt contained in the polymer matrix.

A method for preparing the gel electrolytes is disclosed in U.S. Pat. No. 5,456,000. A cell is assembled by integrating a polymer film with a cathode and an anode and then, laminating. Thereafter, the solvent and the electrolyte salt may be introduced to the polymer film in order to swell the battery. This battery has an advantage of allowing the cell to be fabricated in a non-dry environment. However, a film is formed from a polymer containing a plasticizer in order to facilitate the impregnation of the polymer film with the solvent. As a result, the battery is assembled, the plasticizer is then extracted out to form a micro-porous film and the solvent used for the extraction is evaporated. Such a process requires homogeneous impregnation of the polymer with the solvent and also requires many hours to lengthen the processing time.

In order to overcome the above-described problem, U.S. Pat. No. 5,219,679 discloses a method of preparing a polymer electrolyte after mixing the polymer and liquid electrolyte. In this method, the solvent is already homogeneously dispersed into the polymer prior to the assembling of a battery. An additional process of extracting a plasticizer or drying is not necessary, however, the preparation of the polymer electrolyte and the assembling of the cell should be implemented under a dry condition. Furthermore, if the polymer electrolyte contains a large amount of solvent, the mechanical strength is poor. This makes a continuous processing being difficult and an electrical short being liable to generate.

U.S. Pat. Nos. 5,585,039, 5,639,573, 5,716,421 and 5,688,293 disclose polymer electrolytes prepared by filling polymer electrolytes into porous films which is good enough to overcome the problems of the mechanical strength. According to the method introduced in these patents, a filling process or a coating process of the electrolyte into or onto the porous film is additionally implemented, thus complicating the manufacturing process of the battery.

Therefore, it is preferred that a gel polymer electrolyte containing a polymer and a solvent is prepared, then an anode, a cathode and a polymer electrolyte thus obtained are integrated to manufacture the battery, which simplifies the manufacturing process of the battery.

In this case, since only one coating process is necessary for preparing the polymer electrolyte, the ionic conductivity, mechanical strength of the polymer and the solvent mixture and the interface adhesiveness to the electrodes are anticipated to exhibit good qualities. Since the polymer electrolyte impregnated with the solvent is integrated, a lamination method at a high temperature cannot be used. Accordingly, the polymer electrolyte should have good interface adhesiveness to the electrodes.

U.S. Pat. No. 5,849,433 discloses a method for preparing a polymer electrolyte using a material having a good mechanical strength and adhesiveness in order to improve the mechanical properties. According to the method, the polymer electrolyte is prepared by forming a film from a mixture of materials having a good mechanical strength and adhesiveness to obtain a desired polymer electrolyte and by impregnating the film with a liquid electrolyte. However, in this method, additional impregnation process of the polymer film with the liquid electrolyte is necessary to manufacture the polymer electrolyte.

SUMMARY OF THE INVENTION

It is an object in the present invention to provide a method of manufacturing a lithium secondary battery by directly coating a polymer electrolyte composition having a good mechanical strength and a good adhesiveness onto an electrode.

To accomplish the object, a method of manufacturing a lithium secondary battery is provided in the present invention. A polymer mixture including a) a polymer mixture which includes polyvinylidene fluoride-based polymer and b) at least one polymer selected from the group consisting of polyacrylonitrile and polymethyl methacrylate is mixed with a solvent in which a lithium salt is dissolved. The mixing ratio of the polymer mixture and the solvent is about 1:3–10. Thus obtained first mixture is heated to obtain a polymer electrolyte composition. Thus obtained polymer electrolyte composition is coated onto a first electrode which is one of an anode and a cathode, and then dried to obtain a polymer electrolyte layer. A second electrode which is a remaining one of said anode and cathode is attached onto the polymer electrolyte layer.

Polyvinylidene fluoride-based polymer includes a large amount of electrolyte and lithium salts and provides a good mechanical strength. Polymethyl methacrylate polymer has a good affinity to the solvent which strongly adheres the electrolyte to the electrodes. Polyacrylonitrile polymer has a good adhesiveness to the electrolyte, thus it improves the adhesiveness of the electrolyte to the electrodes without deteriorating the excellent mechanical properties of the polyvinylidene fluoride-based polymer.

According to the present invention, as a lithium secondary battery is manufactured by directly coating a polymer electrolyte composition having a good mechanical strength and a good affinity with the solvent. As a result, a lithium secondary battery having a minimized leakage and evaporation of the solvent in the polymer electrolyte, a stable charge/discharge characteristic and a high capacitance can be manufactured.

BRIEF DESCRIPTION OF THE DRAWINGS

The above object and advantages of the present invention will become more apparent by describing preferred embodiments in detail with reference to the attached drawings in which.

DESCRIPTION OF THE PREFERRED EMBODIMENT

Figure 1:
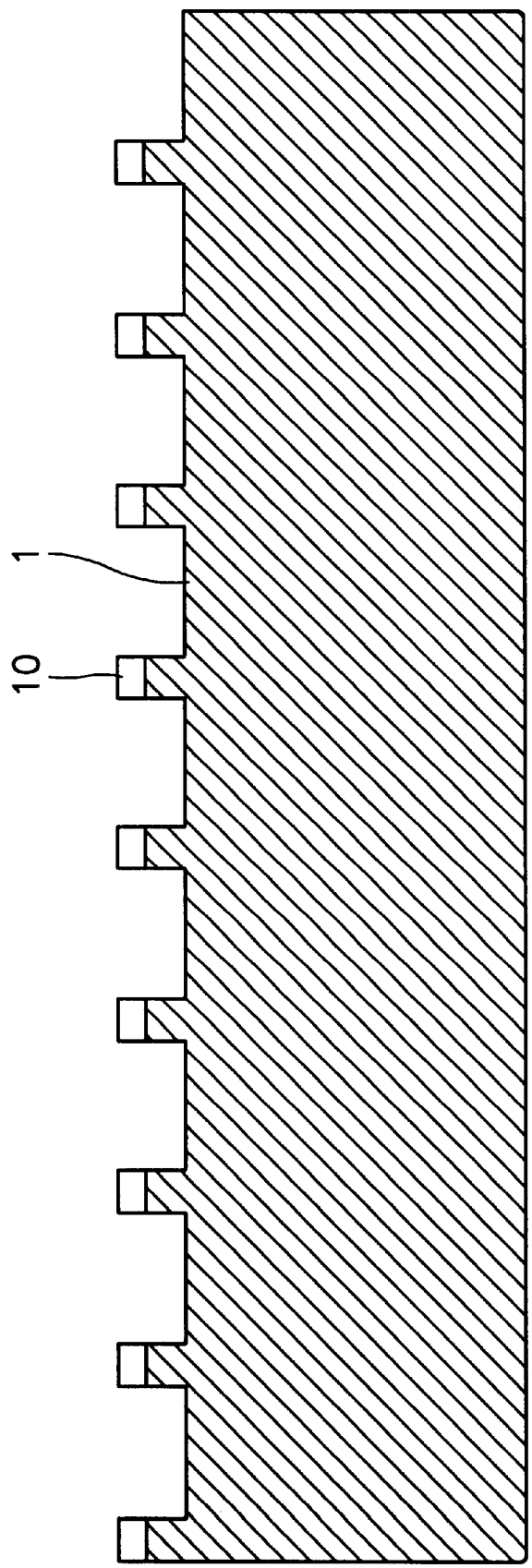
FIGS. 1–3 are illustrated for explaining a method of manufacturing a stack-type lithium secondary battery according to an embodiment of the present invention.

The present invention will be explained in more detail below.

The polymer electrolyte of the present invention is obtained by mixing a polymer mixture and a solvent. The polymer mixture includes a first polymer selected from the group consisting of polyvinylidene fluoride (PVdF) and a copolymer thereof, and a second polymer selected from the group consisting of polymethyl methacrylate (PMMA) and polyacrylonitrile.

As for the polymer, the preferred polymethyl methacrylate has a molecular weight in the range of about 100,000–2,000,000 and a poly disperse index in the range of 1–4. Preferred polyacrylonitrile and polyvinylidene fluoride have molecular weights in the range of about 50,000–1,000,000 and poly disperse indexes in the range of 1–4.

As for the polyvinylidene fluoride copolymer, the preferred additional amount of hexafluoropropane is about 2–30% by weight based on the total amount of the copolymer. It is preferred that the molecular weight of polyvinylidene fluoride-cohexafluoropropane(PVdF-HFP) is in the range of about about 50,000–1,000,000 and the poly disperse index is in the range of 1–4.

If the molecular weights of the above-described polymers are less than the minimum values, the mechanical intensities of thus obtained batteries become poor, and if the molecular weights of the polymers are greater than the maximum values, the viscosities of the polymer electrolyte solutions increase and the manufacturing of films becomes difficult.

When the polymer mixture is obtained by mixing polyvinylidene fluoride and polymethyl methacrylate, and when the amount of polyvinylidene fluoride is 50% or less by weight based on the total amount of the mixture, the mechanical strength decreases and when the amount of polymethyl methacrylate is 10% or less by weight based on the total amount of the mixture, the adhesiveness to the electrodes deteriorates to separate the electrodes and the electrolyte or to evaporate the solvent during an adhering process.

Accordingly, the preferred amount of polyvinylidene fluoride is in the range of 50–90% by weight and that of polyacrylate-based polymer is in the range of 50–10% by weight.

After obtaining the polymer mixture, about 2–50% by weight of silicon oxide ($SiO_2$), zeolite and aluminum oxide ($Al_2O_3$) can be added.

When the polymer mixture is obtained by mixing polyacrylonitrile and polyvinylidene fluoride, the preferred amount of polyacrylonitrile is 50–75% by weight and that of polyvinylidene fluoride is 50–25% by weight. If the amount of polyacrylonitrile is less than 50% by weight, the adhesiveness between the electrodes and electrolyte is lowered and if the amount of polyacrylonitrile is above 75% by weight, mechanical intensity is lowered.

When the polymer mixture is obtained by mixing polyvinylidene fluoride copolymer and polymethyl methacrylate, the preferred amount of polyvinylidene fluoride copolymer is 50–90% by weight and that of polymethyl methacrylate is 50–10% by weight. If the amount of polyvinylidene fluoride copolymer is less than 50% by weight, the mechanical intensity is lowered and if that of polymethyl methacrylate is less than 10% by weight, the adhesiveness between the electrodes and the electrolyte is lowered to cause separation of the electrodes and the electrolyte during the adhering process or to cause evaporation of the solvent.

The polymer mixture can be obtained by mixing polyvinylidene fluoride, polyvinylidene fluoride copolymer and polymethyl methacrylate or obtained by mixing polyvinylidene fluoride, polymethyl methacrylate and polyacrylonitrile.

If the polymer mixture is obtained by mixing polyvinylidene fluoride, polyvinylidene fluoride copolymer and polymethyl methacrylate, the preferred amount of polyvinylidene fluoride and polyvinylidene fluoride copolymer is in the range of 50–90% by weight and that of polymethyl methacrylate is in the range of 50–10% by weight. At this time, the preferred amount of polyvinylidene fluoride is 40% or less by weight based on the total amount of polyvinylidene fluoride and polyvinylidene fluoride copolymer.

Polyvinylidene fluoride improves the mechanical strength of the polymer electrolyte and facilitates the impregnation of the electrodes with the solvent. If the amount of polyvinylidene fluoride is out of the given range, the adhesiveness between the electrodes and the electrolyte becomes too weak and they are liable to separate.

When the polymer mixture is obtained by mixing polyvinylidene fluoride, polymethyl methacrylate and polyacrylonitrile, the preferred amount of polyvinylidene fluoride is 25–50% by weight and that of polymethyl methacrylate and polyacrylonitrile is 50–75% by weight. At this time, the amount of polymethyl methacrylate is 30% or less by weight based on the total amount of polymethyl methacrylate and polyacrylonitrile. If the amount of polymethyl methacrylate is out of the given range, the mechanical intensity of the polymer electrolyte is lowered and an electric short of a battery occurs easily.

As for the solvents which are used for the polymer electrolyte, ethylene carbonate (EC), propylene carbonate (PC), diethyl carbonate (DEC), dimethyl carbonate (DMC), ethyl methyl carbonate (EMC), gamma-caprolactone (γ-BL) and a mixture thereof can be exemplified. The preferred mixing ratio of the polymer mixture and the solvent is in the range of 1:3–10, more preferably, it is in the range of 1:4–8. If the mixing ratio of the polymer mixture is over the upper limit, adhesiveness and ionic conductivity are decreased even if a good mechanical strength is accomplished. If the mixing ratio of the polymer mixture is less than the lower limit, the mechanical strength of the polymer electrolyte is lowered.

In order to increase the discharge capacitance at a low temperature, it is preferred that the amount of ethylene carbonate is less than 50% by weight based on the total amount of the solvent. If the amount of ethylene carbonate is less than 20% by weight, the dissociation degree of a salt decreases. Therefore, it is preferred that the amount of ethylene carbonate is about 20–50% by weight based on the total amount of the solvent.

Ethyl methyl carbonate, diethyl carbonate and dimethyl carbonate can prevent the crystallization of ethylene carbonate and lower the viscosity of the solvent in order to improve the characteristics at low temperature. The preferred amount of ethyl methyl carbonate, diethyl carbonate and dimethyl carbonate is in the range of 20–70% by weight based on the total amount of the solvent. If the amount is over 70% by weight, volatilization occurs at a high temperature.

In order to control the mechanical strength, the adhesiveness and ionic conductivity of the polymer electrolyte, a solvent which does not lower the characteristics at a low temperature while controlling the polarity of the solvent, is required. Propylene carbonate and gamma-caprolactone (γ-BL) satisfy these requirements. Even though viscosities of these solvents are higher than those of ethyl methyl carbonate, diethyl carbonate and dimethyl carbonate, melting points are lower than those of the three solvents to restrain crystallization at a low temperature and to give a good dissociation degree of salts. Accordingly, it is preferred that propylene carbonate and γ-BL are added to ethylene carbonate, or added to a mixture of ethyl methyl carbonate, diethyl carbonate and dimethyl carbonate to control the properties of the polymer electrolyte.

The preferred amount of propylene carbonate and γ-BL are in the range of 5–40% by weight based on the total amount of the solvent.

As for the lithium salt, 0.5–2M of lithium perchlorate ($LiClO_4$), lithium trifluoromethane sulfonate ($LiCF_3SO_3$), lithium borofluoride ($LiBF_4$), lithium hexafluorophosphate ($LiPF_6$), lithium arsenic hexafluoride ($LiAsF_6$) or a mixture thereof are exemplified. At this time, $LiPF_6$ is advantageous for improving the ionic conductivity and $LiClO_4$ is advantageous for increasing the lifetime of the battery.

When the polymer mixture and the electrolyte are mixed to prepare the polymer electrolyte in which each phase is separated, the mechanical strength can be largely increased compared to the conventional polymer electrolyte in which a polymer mixture and a a solvent are homogeneously mixed.

A method of manufacturing a lithium secondary battery using the above-described polymer electrolyte composition will be described in detail, below.

A polymer mixture and a solvent including electrolytic salts are mixed in a mixing ratio of 1:3–10 at room temperature. Then, thus obtained mixture is firstly heated to about 25–100° C. for about 10 minutes to 3 hours and then is heated again to about 100–180° C. for about 5 minutes to 1 hour to prepare a homogeneous and viscous polymer electrolyte solution. At this time, the first heating can be omitted.

If thus obtained polymer electrolyte solution is not homogeneous and a part of the polymer is not dissolved, the mechanical strength of the polymer electrolyte and the uniformity of a film are lowered.

The polymer electrolyte composition is coated on one electrode among a cathode and an anode. Preferably, the composition is coated on the anode because generally, the anode is larger than the cathode. If the composition is coated on the smaller cathode and then the anode is attached onto the coated composition, a cut surface of the cathode contacts the anode to induce an electric short. On the contrary, when the cathode is larger than the anode, it is advantageous that the polymer electrolyte composition is coated on the cathode.

The coated composition on the electrode is liquid state. The phase of this liquid composition changes into a solid gel state through a drying process to form an integrated body of the electrode with a polymer electrolyte. At this time, a small amount of the electrolyte penetrates into the electrode to enhance a function of improving ion transfer. For a uniform coating of the polymer electrolyte composition, a preferred viscosity range of the composition is about 1,000–50,000 cps. In addition, it the preferred thickness of the coated composition is in the range of about 20–100 $\mu$m.

Preferably, the anode is cut before the coating of the composition, because the cutting of the anode without the coated electrolyte is more advantageous than the coated anode.

At this time, the polymer electrolyte contains an organic solvent including ionic salts as ion transfer media and exhibits a good mechanical strength and a good adhesiveness with the electrode. In order to increase the mechanical strength of the electrolyte with a counter electrode, a drying process is implemented after coating the composition on the first electrode and before attaching the counter electrode. The drying process is preferably implemented at a temperature range of from room temperature to 60° C. for a time period of about 1 minute–1 hour. If the drying temperature is higher than 60° C. and the drying period is longer than 1 hour, almost all of the solvent at the surface of the electrolyte is evaporated and the adhesiveness of the electrolyte is weakened to deteriorate the attaching state of the electrolyte with the counter electrode of a unit cell or a multi-layered cell. This increases a contact resistance between the electrolyte and the electrode. In addition, as the solvent which is contained in the polymer electrolyte is evaporated, the ionic conductivity of the polymer electrolyte is reduced to deteriorate a high current characteristic. Accordingly, it is preferred that the condition of the drying process is in the above-described ranges.

After the drying, the counter electrode is attached with the polymer electrolyte layer to make a uniform adhesion of the counter electrode with the polymer electrolyte. In order to attach the counter electrode with the polymer electrode, it is preferred that a pressure of about 0.01–100N/cm$^2$ is applied. Through implementing the above-described processes, an integrated cell of the cathode, the polymer electrolyte and the anode can be manufactured. After coating the polymer electrolyte composition on both sides of the anode and attaching the cathode on one side of is thus obtained polymer electrolyte layer to manufacture a unit cell, another unit cell is integrated to increase an integration number.

Onto thus obtained multi-layered cell, tabs are attached and thus manufactured cell is put into an aluminum pack. A predetermined amount of a liquid electrolyte is injected into the pack and this pack is packaged to manufacture a stacked battery.

A liquid electrolyte is added to the electrode and electrolyte of thus formed cell to improve a highly efficient discharging characteristic and a discharging characteristic at a low temperature. Other than the injecting method, the cell can be dipped into the liquid electrolyte before being packed.

As for the solvent, ethylene carbonate, propylene carbonate, diethyl carbonate, dimethyl carbonate, ethyl methyl carbonate, gamma-caprolactone or a mixture thereof along with at least one salt of lithium perchlorate (LiClO$_4$), lithium trifluoromethane sulfonate (LiCF$_3$SO$_3$), lithium borofluoride (LiBF$_4$), lithium hexafluorophosphate (LiPF$_6$) and lithium arsenic hexafluoride (LiAsF$_6$) can be used. This solvent can be different from the solvent used for the preparation of the polymer electrolyte.

Preferably, the solvent which is used for the preparation of the polymer electrolyte is selected considering the mechanical strength and the adhesiveness of the electrolyte, while the additionally injected solvent is selected considering a high capacitance and performance at high and low temperatures of the battery.

A wound battery can be manufactured by winding a unit integrated body. For this case, a tab is attached with an electrode of which both sides are coated with the polymer electrolyte and then, a counter electrode onto which another tab is attached is attached onto the polymer electrolyte. Thus obtained integrated body is wound. Thus obtained wound cell is impregnated with a liquid electrolyte and then is put into an aluminum can or an aluminum pack. Otherwise, thus obtained wound cell is put into an aluminum can or an aluminum pack and then a predetermined amount of a liquid electrolyte is injected. After that, the can or pack is sealed to manufacture a wound battery.

Preferred embodiments of the present invention will be described in detail with reference to the attached drawings, below.

Figure 2:
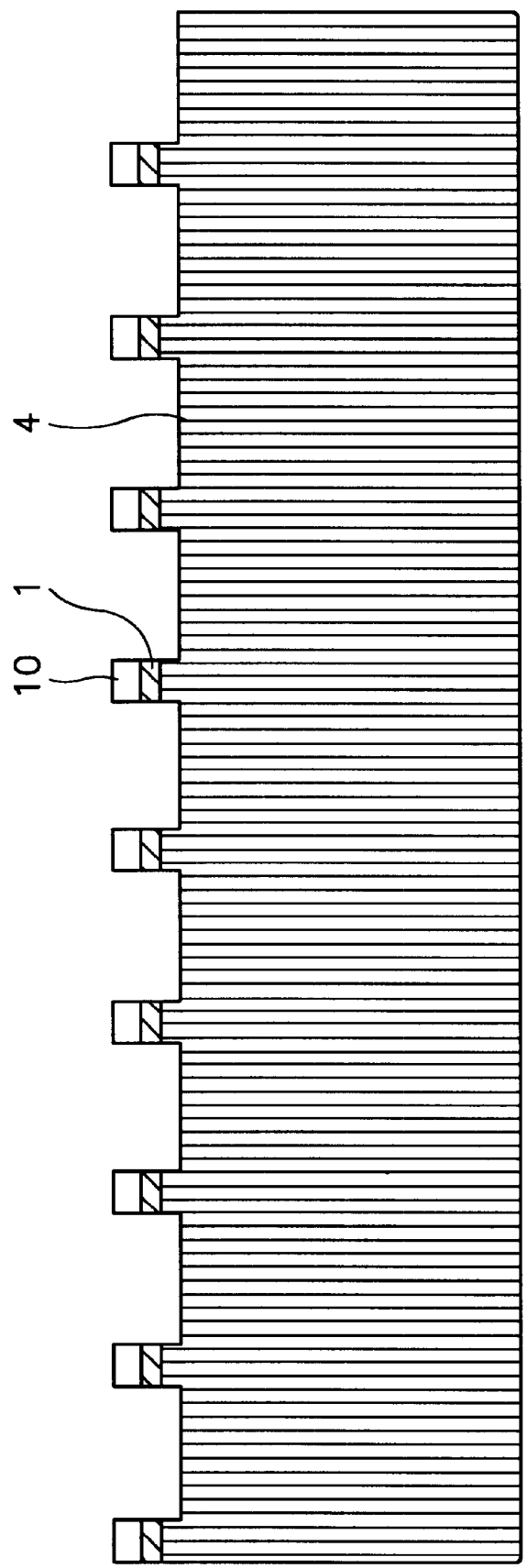
Figure 3:
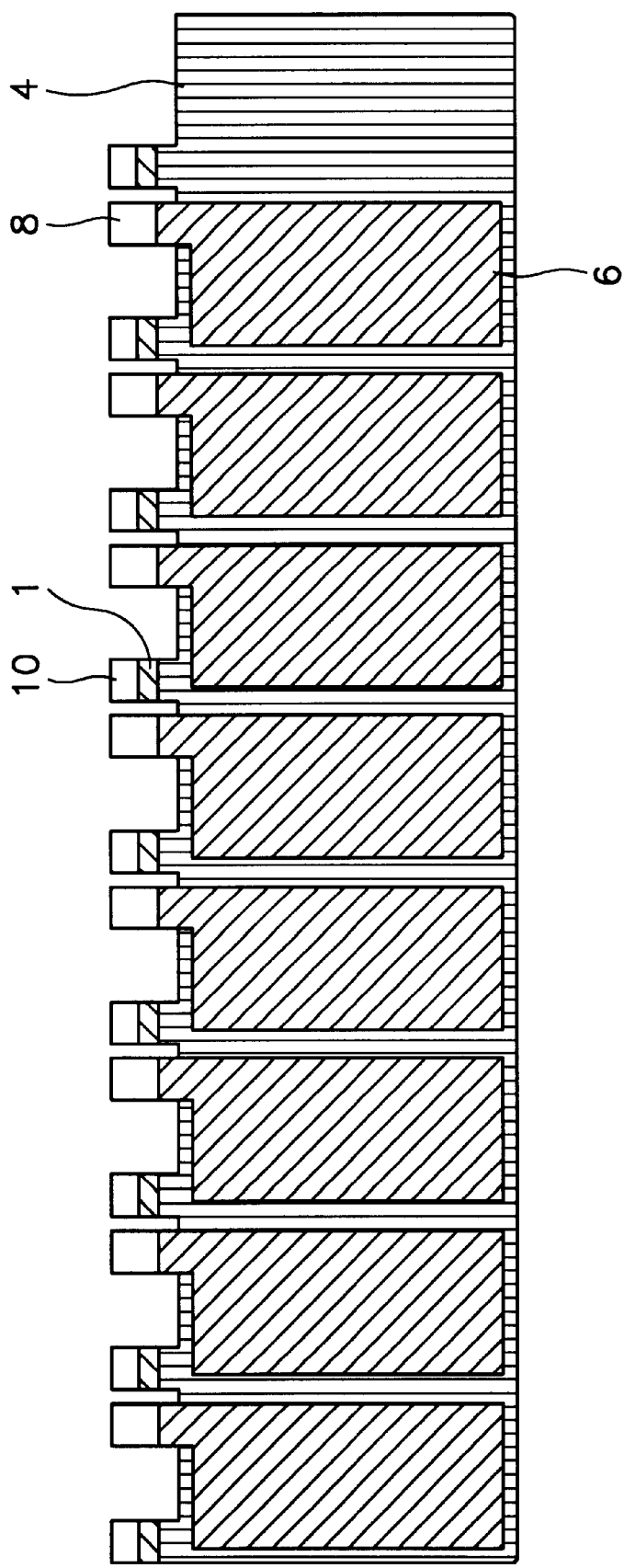

FIGS. 1–3 are illustrated for explaining a method of manufacturing a stack-type lithium secondary battery according to an embodiment of the present invention. In this embodiment, an anode is larger than a cathode.

First, a polymer electrolyte composition is prepared by a method described in Example 1 in U.S. Pat. Ser. No. 09/484,535. This composition is coated on both sides of a first electrode, anode. The anode is preferably cut into a predetermined shape before the coating of the composition for an advantageous manufacturing of a battery.

For a continuous process, an anode 1 is cut into a shape illustrated in FIGS. 1 and 2. Anode 1 is commonly manufactured from carbon. In this embodiment, anode 1 is manufactured by coating carbon on both sides of a collector of anode 10 which is manufactured from an cupper foil, to a thickness of about 10–50 mm. The polymer electrolyte composition is widely coated onto anode 1 so that a portion of a tab is covered by the composition. Then, a drying is implemented at room temperature for about 30 minutes to form a polymer electrolyte layer 4.

A second electrode, cathode 6 cut so as to have a smaller size than anode 1 is attached with polymer electrolyte layer 4 as shown in FIG. 3. Cathode 6 is commonly manufactured from lithium metal oxide. In this embodiment, cathode 6 is manufactured by coating lithium metal oxide on both sides of collector of cathode 8 which is formed from an aluminum foil, to a thickness of about 10–100 $\mu$m.

Figure 4A:
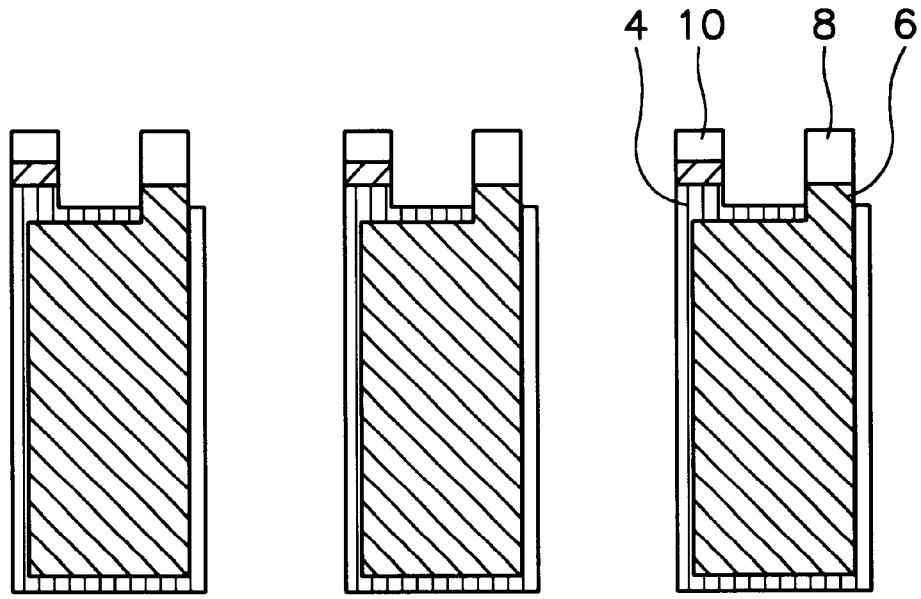
FIGS. 4A & 4B are respectively a front view and a cross-sectional view of a unit cell manufactured by an embodiment of the present invention.
Figure 4B:
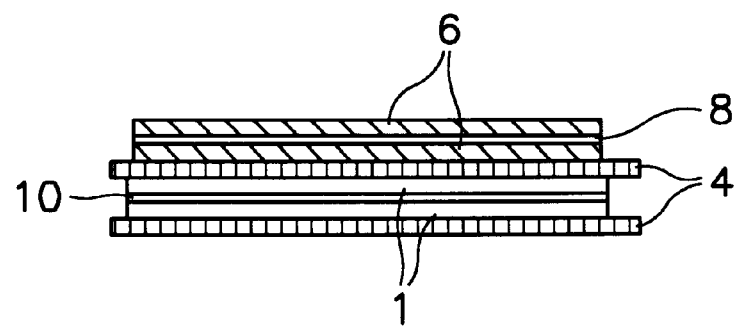

Thus obtained integrated strip including cathode 6 is cut into an appropriate size to obtain unit cells as shown in FIGS. 4A & 4B as a front view and a cross-sectional view.

Figure 5A:
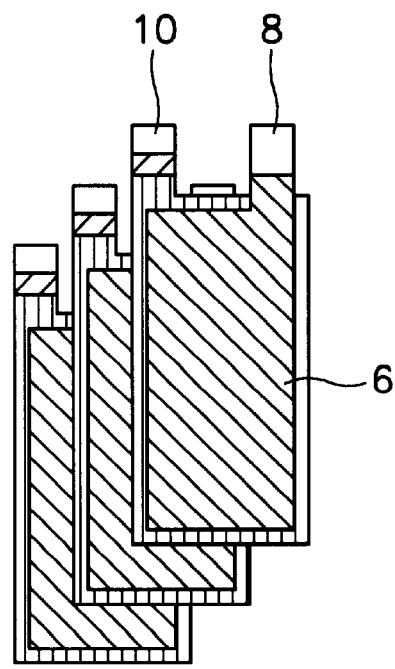
FIGS. 5A & 5B are respectively a perspective front view and a cross-sectional view of a multi-layered cell manufactured by an embodiment of the present invention.
Figure 5B:
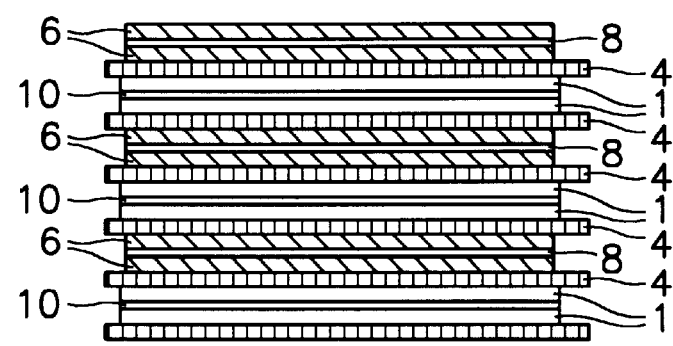

By integrating the unit cells as shown in FIGS. 5A & 5B as a front perspective view and a cross-sectional view, a multi-layered cell is manufactured. At this time, the anode and the polymer electrolyte are attached by the adhesiveness of the polymer electrolyte and a certain applied pressure. If this applied pressure is too weak, a uniform adhesion between them cannot be accomplished and if this applied pressure is too high, the cathode and the anode might contact to induce an electric short. Therefore, an appropriate pressure should be applied.

After the manufacture of the integrated cell of the cathode, the polymer electrolyte and the anode, a tab is attached. As for the tab, a metal such as Ni, Al, etc. can be utilized for the cathode and a metal such as Ni, Cu, etc. can be utilized for the anode. This cell is put into an aluminum pack or an aluminum can and a predetermined amount of a liquid electrolyte is injected. Then, an opening portion is packaged to complete a stacked battery.

Figure 6:
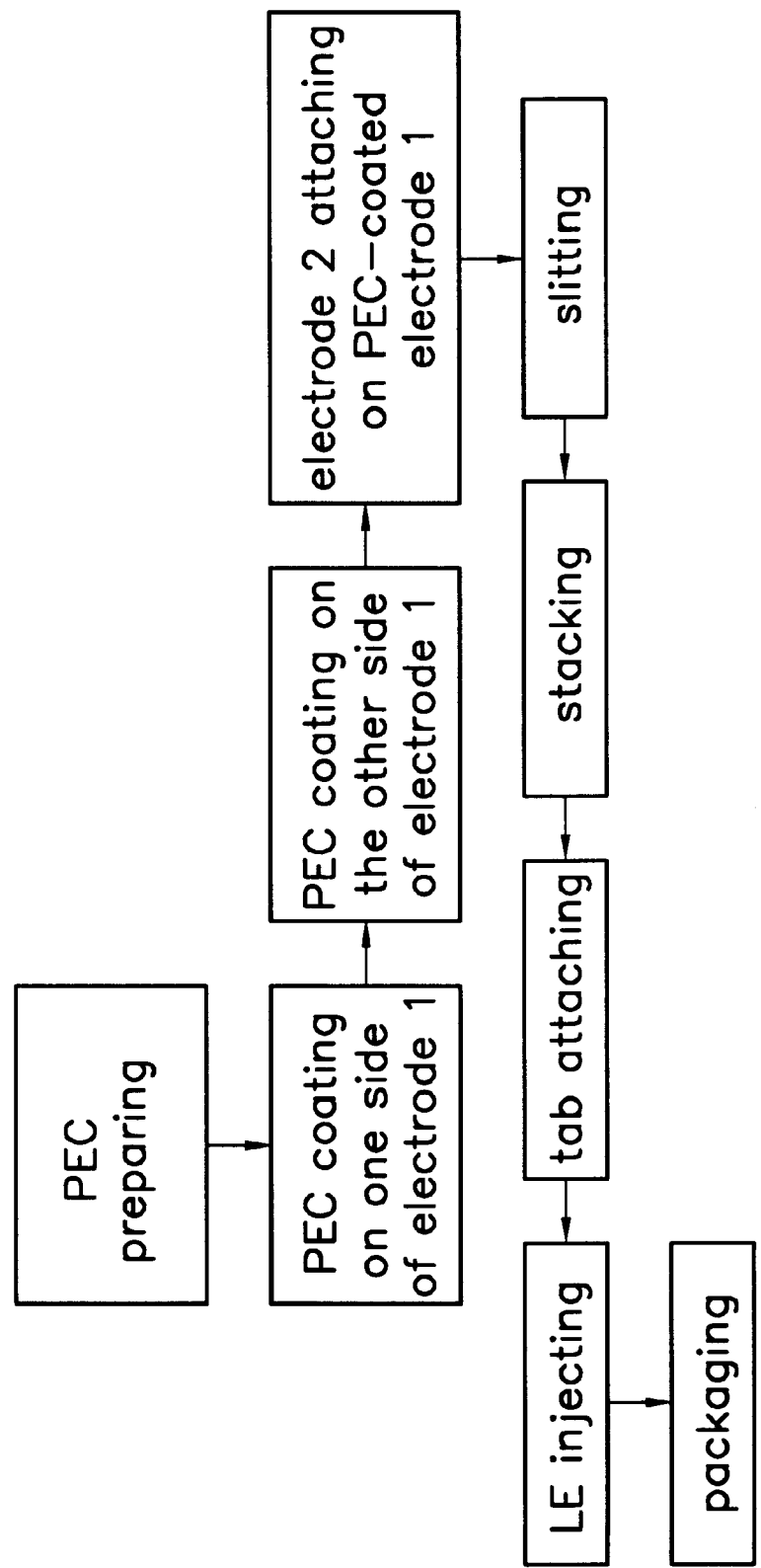
FIG. 6 is a flow chart for showing processes for manufacturing a stacked battery according to an embodiment of the present invention.

FIG. 6 is a flow chart for showing schematic processes for manufacturing a stack-type battery according to this embodiment of the present invention, in summary. In this drawing, PEC represents the polymer electrolyte composition and LE represents the liquid electrolyte.

Another preferred embodiment of the present invention will be described in detail, below.

Figure 7A:
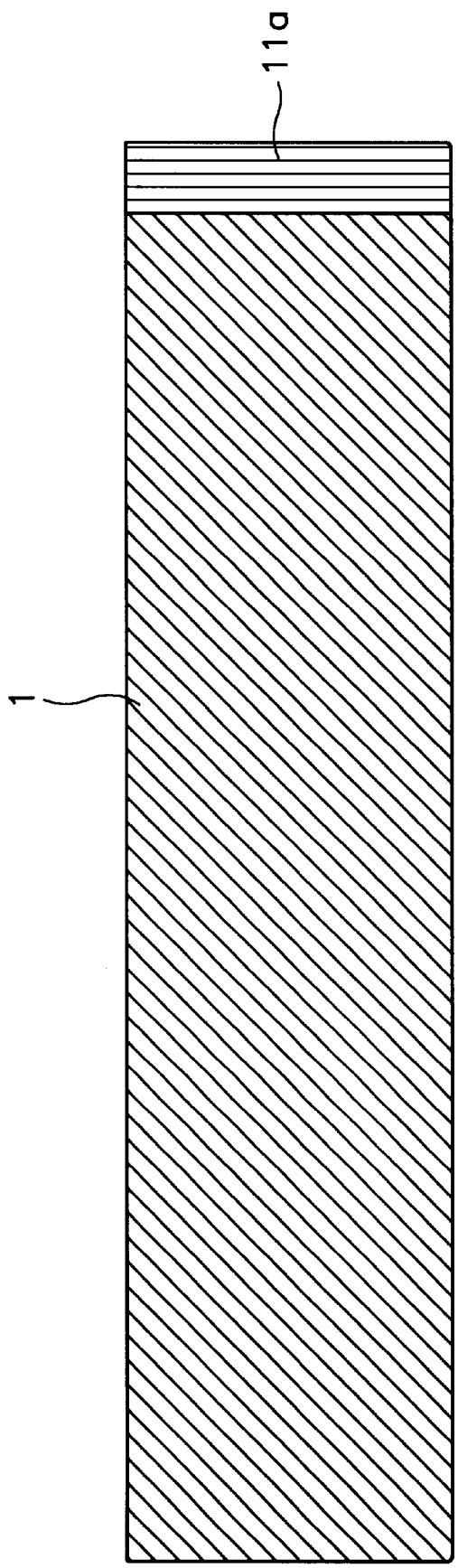
FIGS. 7A–7C are illustrated for explaining a method of manufacturing a wound lithium secondary battery according to another embodiment of the present invention.
Figure 7B:
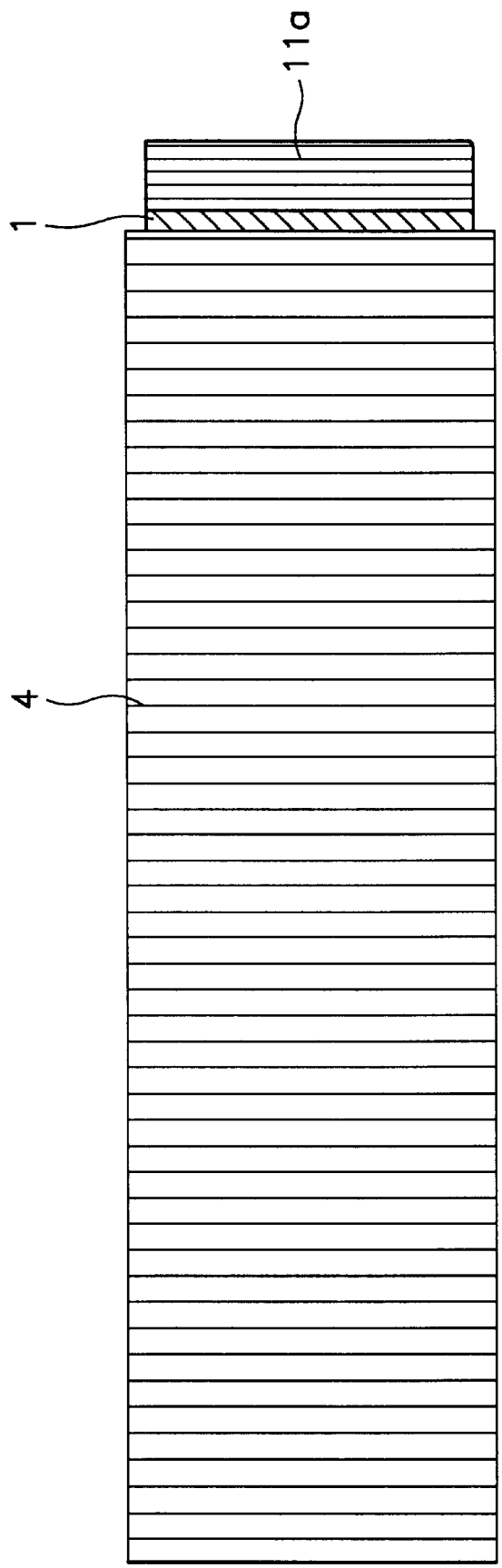
Figure 7C:
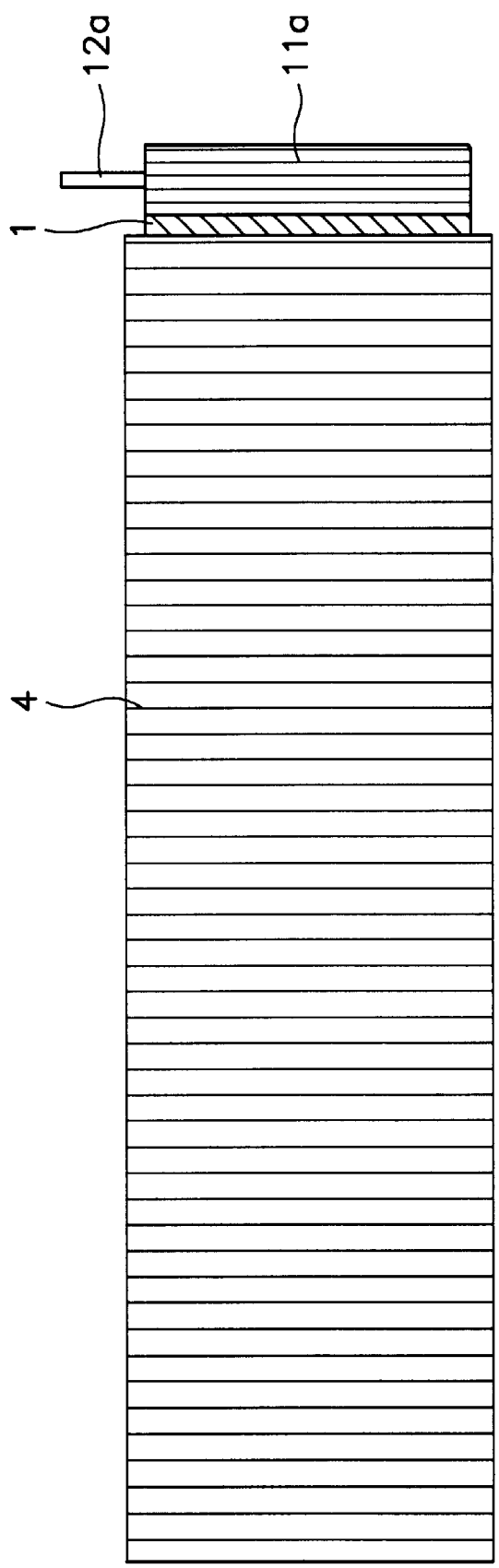

FIGS. 7A–7C are illustrated for explaining a method of manufacturing a wound lithium secondary battery according to another embodiment of the present invention.

In FIG. 7A, a first electrode, anode 1 cut into a rectangular shape is illustrated. Onto both sides of anode 1, the polymer electrolyte composition prepared by a method described in Example 1 in U.S. Pat. Ser. No. 09/484,535, is coated so that the composition sufficiently covers anode 1. A drying is implemented at room temperature for 30 minutes to form a polymer electrolyte layer 4 on anode 1, as shown in FIG. 7B. Then, a tab 12a is attached with a plain portion 11a on which the electrode is not coated, as shown in FIG. 7C.

Figure 8:
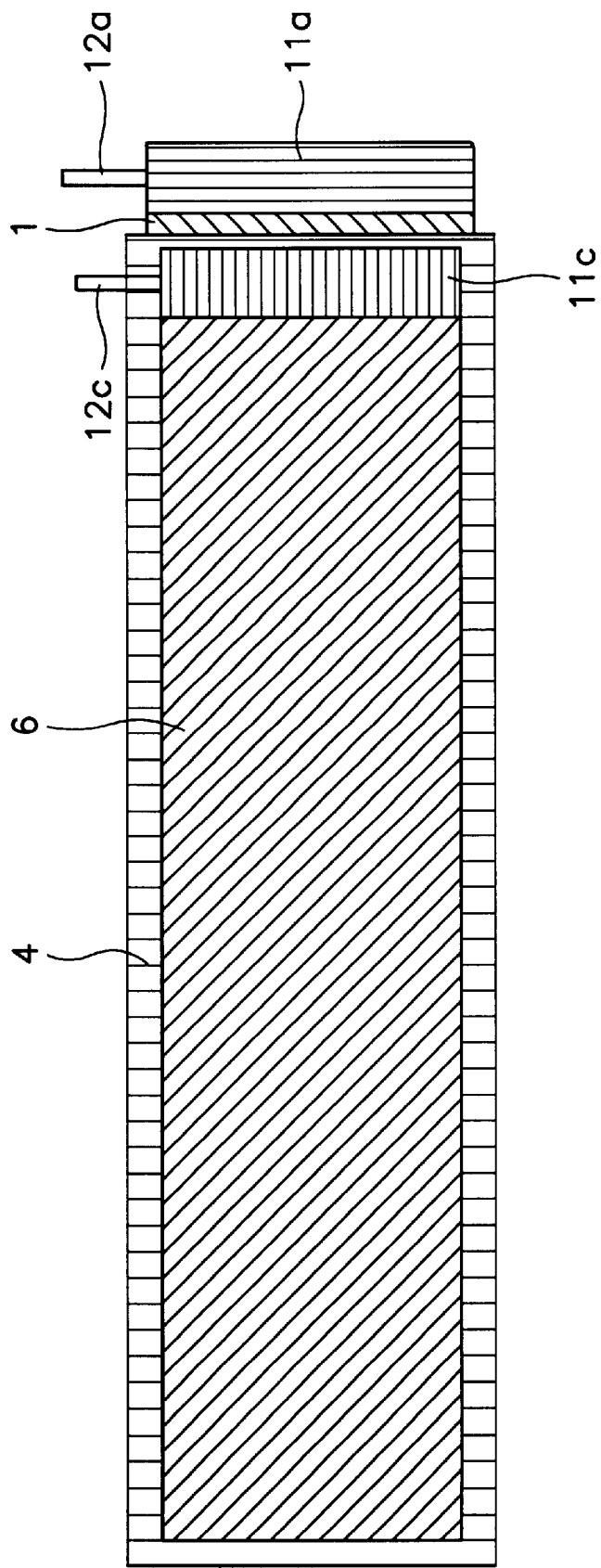
FIG. 8 is illustrated for showing an integrated state of an anode, a polymer electrolyte and a cathode for the manufacture of a wound lithium secondary battery according to another embodiment of the present invention.

As shown in FIG. 8, a second electrode, cathode 6 is cut and attached onto polymer electrolyte layer 4 to obtain an integrated structure of anode 1, polymer electrolyte layer 4 and a second electrode, cathode 6, and then, a tab 12c is attached with a plain portion 11c on which the electrode is not coated. It is confirmed that cathode 6 is smaller than anode 1 and is cut into a strip shape. Then, this integrated structure is wound to manufacture a winding cell.

The winding cell is put into an aluminum pack or an aluminum can and a predetermined amount of liquid electrolyte is injected. Then, an opening portion is sealed to complete a wound battery.

Figure 9:
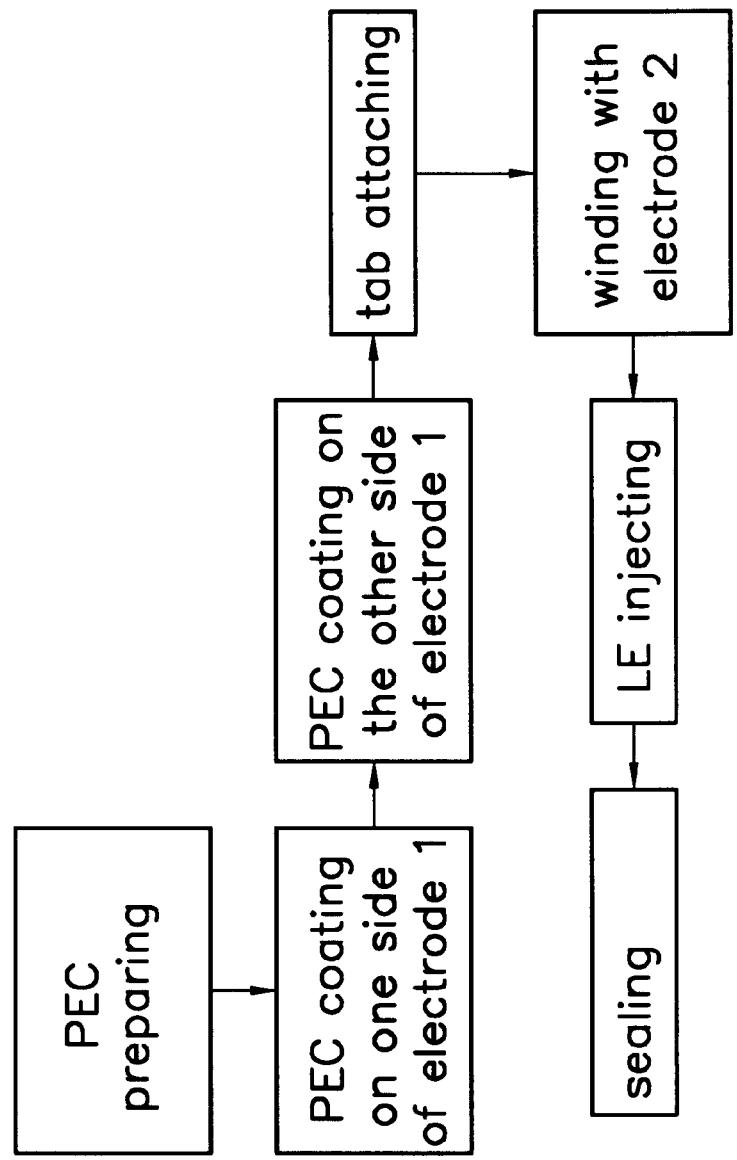
FIG. 9 is a flow chart for showing processes for manufacturing a wound battery according to another embodiment of the present invention.

FIG. 9 is a flow chart for showing processes for manufacturing a winding-type battery according to this embodiment of the present invention. In FIG. 9, PEC represents the polymer electrolyte composition and LE represents the liquid electrolyte as in FIG. 6.

As described above, a polymer electrolyte composition is prepared by using polyvinylidene-based polymer having a good mechanical strength and polyacrylate-based polymer having a good affinity and a lithium secondary battery is advantageously manufactured by directly coating this composition on an electrode. In addition, both stacked and wound battery can be selectively manufactured as occasion needs, by the present invention.

Thus obtained lithium secondary battery has a stable charge/discharge characteristic and a high capacitance. In addition, due to the strong affinity of the electrolyte for the solvent, a leakage and evaporation of the solvent can be minimized.

While the present invention is described in detail referring to the attached embodiments, various modifications, alternate constructions and equivalents may be employed without departing from the true spirit and scope of the present invention.

What is claimed is:

1. A method of manufacturing a lithium secondary battery comprising the steps of:

mixing a polymer mixture including a) polyvinylidene fluoride-based polymer and b) at least one polymer selected from the group consisting of polyacrylonitrile and polymethyl methacrylate with a solvent in which a lithium salt is dissolved, said polymer mixture and said solvent being mixed in a mixing ratio of about 1:3–10;

heating thus obtained first mixture to obtain a polymer electrolyte composition;

coating thus obtained polymer electrolyte composition on a first electrode which is one of an anode and a cathode, and then drying to obtain a polymer electrolyte layer; and attaching a second electrode which is a remaining one of said anode and cathode onto said polymer electrolyte layer.

2. A method of manufacturing a lithium secondary battery as claimed in claim 1, wherein said drying is implemented at a temperature range of from room temperature –60° C. for a time period of 1 minute–1 hour.

3. A method of manufacturing a lithium secondary battery as claimed in claim 1, wherein said polymer electrolyte composition is coated on said first electrode to a thickness range of 20–100 $\mu$m.

4. A method of manufacturing a lithium secondary battery as claimed in claim 1, wherein said first electrode is larger than said second electrode.

5. A method of manufacturing a lithium secondary battery as claimed in claim 1, wherein a viscosity of said polymer electrolyte composition is in the range of 1,000–50,000 cps.

6. A method of manufacturing a lithium secondary battery as claimed in claim 1, wherein said second electrode is attached with said polymer electrolyte layer by applying a pressure of 0.01–100 N/cm$^2$.

7. A method of manufacturing a stacked lithium secondary battery comprising the steps of:

mixing a polymer mixture including a) polyvinylidene fluoride-based polymer and b) at least one polymer selected from the group consisting of polyacrylonitrile and polymethyl methacrylate with a solvent in which a lithium salt is dissolved, said polymer mixture and said solvent being mixed in a mixing ratio of about 1:3–10;

heating thus obtained first mixture to obtain a polymer electrolyte composition;

coating thus obtained polymer electrolyte composition on a first surface of a first electrode which includes the first surface and a second surface and is one of an anode and a cathode, and then drying to obtain a polymer electrolyte layer;

coating said polymer electrolyte composition on the second surface of said first electrode;

attaching a second electrode which is a remaining one of said anode and cathode with said polymer electrolyte layer to obtain a unit cell;

stacking a plurality of said unit cells to obtain a multi-layered cell;

impregnating said multi-layered cell with a predetermined amount of a liquid electrolyte; and packaging thus obtained multi-layered cell.

8. A method of manufacturing a lithium secondary battery as claimed in claim 7, wherein said first electrode is larger than said second electrode.

9. A method of manufacturing a wound lithium secondary battery comprising the steps of:

mixing a polymer mixture including a) polyvinylidene fluoride-based polymer and b) at least one polymer selected from the group consisting of polyacrylonitrile and polymethyl methacrylate with a solvent in which a lithium salt is dissolved, said polymer mixture and said solvent being mixed in a mixing ratio of about 1:3–10;

heating thus obtained first mixture to obtain a polymer electrolyte composition;

coating thus obtained polymer electrolyte composition on a first surface of a first electrode which includes the first surface and a second surface and is one of an anode and a cathode, and then drying to obtain a polymer electrolyte layer;

coating said polymer electrolyte composition on the second surface of said first electrode;

attaching a second electrode which is a remaining one of said anode and cathode with said polymer electrolyte layer and then winding;

impregnating said winding cell with a predetermined amount of a liquid electrolyte; and sealing thus obtained winding cell.

10. A method of manufacturing a lithium secondary battery as claimed in claim 9, wherein said first electrode is larger than said second electrode.

* * * * *